3,423,440
PREPARATION OF MONOGLYCERIDE PHOSPHORIC ACID AND SALTS THEREOF
John D. Cawley and Mary Patricia O'Grady, Rochester, N.Y., assignors to Eastman Kodak Company, Rochester, N.Y., a corporation of New Jersey
No Drawing. Filed Dec. 29, 1965, Ser. No. 517,463
U.S. Cl. 260—403
Int. Cl. C11c 3/04
10 Claims

ABSTRACT OF THE DISCLOSURE

Method for preparing lysophosphatidic acid or lysophosphatidates by reacting in solution a glycidyl ester of an aliphatic fatty acid having 6–22 carbon atoms or benzoic acid with anhydrous phosphoric acid to produce the acid, which is then recovered. For a univalent salt, the reaction mixture is neutralized with an alkali metal hydroxide instead of recovering the acid. When a polyvalent metallic salt is desired, there is a subsequent double decomposition reaction between an aqueous solution of the univalent salt and a water soluble salt of the polyvalent metal.

---

The present invention relates to a novel method for preparing lysophosphatidic acid or lysophosphatidates having the structure (I) $RCO-O-CH_2CHOHCH_2-O-PO(OR')(OR'')$ wherein R represents an aliphatic or aromatic hydrocarbyl radical and R' and R'' represent hydrogen or a univalent metal; or wherein R' and R'' together represent a polyvalent metal such as divalent calcium or trivalent iron. Such compounds are also called monophosphate derivatives of monoglycerides, phosphorylated monoglycerides, or α'-acyl derivatives of α-glycerophosphates.

The mono and dialkali metal compounds prepared by the novel method are insoluble in fats and oils but soluble in water, and are hydrophilic emulsifying agents useful in foods. The lysophosphatidic acids, wherein R' and R'' are hydrogen, are soluble in fats and oils and are useful to prevent rancidification of edible oils and fats. The calcium salt, wherein R' and R'' together are calcium, are soluble in fats and oils and are useful oil soluble emulsifying agents.

Up until the present time, there has been no completely satisfactory method available for making lysophosphatidates which permits them to be used in food products. In one prior art procedure, described at Ber. 71, 1073 (1938) by Kabashina, a monoglyceride was reacted with POCl, in the presence of a tertiary amine, or with $P_2O_5$ (as described in U.S. Patents 2,026,785 and 2,177,983). In another reported reaction α-glycerophosphate is reacted with fatty acid chloride in the presence of a tertiary amine [reported by Arnold, Ber. 71, 1505 (1938)].

The use of tertiary amines for the synthesis of compounds intended for use in foods is undesirable, and the use of fatty acid chlorides is uneconomical. The reaction of $P_2O_5$ with alcohol is a complex reaction, and its reaction with a monoglyceride yields a mixture of products. It is apparent, therefore, that the prior art methods require extensive and costly purification procedures for the removal of contaminants such as metal chlorides, inorganic phosphates, by-products such as diesters of phosphoric acid, and toxic materials such as pyridine or quinoline. Furthermore, yields by the prior art methods are poor; Kabashina, for example, reporting only a 29.8% yield.

We have now devised a new method for making substantially monomeric lysophosphatidates, having substantially the structure (I), in excellent yields and without the use of amines or halogenated phosphorylating reagents or other materials detrimental in foods. Moreover, by our new method only small amounts of by-products are formed, and these are only mono- and diglycerides and inorganic phosphates, which can be readily separated from the principal product, and which are physiologically innocuous and generally recognized as safe for use in foods, even if complete separation is not secured.

Our new method comprises reacting in solution a glycidyl ester of a hydrocarbyl carboxylic acid (advantageously having from 6 to 22 carbon atoms), having the structure (II) 

with anhydrous phosphoric acid ($H_3PO_4$) to yield the product having the structure (I), wherein R' and R'' both represent hydrogen. This initial compound can then be recovered from the reaction mixture and utilized as such. Among suitable glycidyl esters are those of aromatic acids such as benzoic acid, wherein R is 6, and fatty acids such as those wherein R is 10 to 20.

If a univalent metal salt is desired, such as an alkali metal (M) salt, separation of the initial compound is not performed, but instead the reaction mixture is neutralized by adding thereto a suitable amount of the univalent metal hydroxide (e.g., NaOH) to yield stoichiometrically either the monometallic (R'=M; R''=H) or the dimetallic salt (R'=M; R''=M).

When a polyvalent metallic salt is desired, this is most advantageously secured by a subsequent double decomposition reaction between an aqueous solution of the univalent metal salt described previously with a water soluble salt of the desired polyvalent metal.

The anhydrous phosphoric acid should have a $P_2O_5$ equivalent of at least 72%. Such anhydrous phosphoric acid has been prepared by removing the water from 85% $H_3PO_4$ azeotropically with xylene. Dehydrated pyrophosphoric acid, which has a $P_2O_5$ equivalent of 79.8%, is also satisfactory. We prefer, however, to use dehydrated commercial polyphosphoric acid of 83% $P_2O_5$ equivalent (equal to 115% $H_3PO_4$) because of its ready availability and low cost. If the water is not removed, much of the glycide ester is converted to mono- and diglycerides by hydrolysis and disproportionation, and the yield of product (I) is poor.

We have found it advantageous to use an amount of anhydrous polyphosphoric acid not in excess of 1 mole of $H_3PO_4$ per mole of the glycidyl ester, so as to assure that virtually no inorganic phosphate by-products will be formed. A greater amount of acid can be used; but great care is required to assure that it is all reacted with, for example, the metal hydroxide in the second step, whereby it is converted to metal phosphate. Otherwise, some metallic polyphosphorylated monoglyceride by-product is obtained which contains more phosphorus and less fatty acid than structure (I) requires.

As solvent for the reaction, we prefer one in which the glycidyl ester and the final product are both soluble, and in which the polyphosphoric acid is insoluble. We prefer aliphatic hydrocarbons such as petroleum ether, ligroin, and hexane because of their low toxicity and cheapness. Other solvents can be used, however, but are subject to certain disadvantages such as the reduced yield of product when dioxane or ether are used; or the toxicity and the possibility of side reactions when using chlorinated solvents such as chloroform or trichloroethylene. The toxicity of aromatic hydrocarbons such as benzene or xylene also reduces their desirability when the product is to be used in foods, even though they are operable.

The reaction is desirably carried out at the boiling point of the solvent (provided this does not exceed about 100° C.), while refluxing and stirring.

When the initial product having the structure (I), wherein both R' and R" are hydrogen, is to be isolated, this is accomplished by crystalliaztion from a nonhydroxylic solvent such as acetone.

The duration of the reaction depends upon the tempera- this is accomplished by crystallization from a nonhydroxtors. We have reacted successfully for ½ hour at 69° C., and for 4½ hours at 35° C. The reaction should continue at least until the initially insoluble polyphosphoric acid has all reacted and disappeared.

When converting the initial product to a metallic derivative, such as an alkali metal derivative, the alkali metal hydroxide is first dissolved to form a concentrated solution in water or in 50% aqueous methanol; and this solution is added to the reaction mixture in the desired quantity. The resulting alkali metal salts of structure (I), wherein either or both of R' and R" represent alkali metal, are separated from by-products such as sodium phosphates and glycerides by filtering the reaction mixture, distilling the filtrate to dryness for removing water and methanol, and treating the dry residue with acetone to dissolve the glycerides. Other purification methods can be used.

The starting material, the glycidyl ester, can be secured from any suitable source. We have found it advantageous to make this ester by the method attributed to Maerker et al. and described in J.A.O.C.S. 38, 194 (1961), or in J. Org. Chem. 26, 2681 (1961).

EXAMPLE I

Monoglyceride phosphoric acid was prepared as follows:

A mixture of 34.15 g. (0.1 mole) of glycidyl stearate and 8.52 g. (0.1 mole) of dehydrated commercial polyphosphoric acid in 130 ml. of hexane was refluxed with stirring for 45 minutes until the polyphosphoric acid dissolved and the solution was clear. Refluxing was continued for another ½ hour. The solvent was removed by vaporization in a vacuum, and the residue was dissolved in hot acetone and then crystallized from the acetone at room temperature.

37.15 g. of a white powder, having a melting point of 68.5 to 71° C., was obtained for a yield of 86.8%. The compound analyzed 68% fatty acid and 5.8% phosphorus, which compared favorably with the values of 64.8% fatty acid and 7.1% phosphorus, calculated for the formula $C_{21}H_{43}O_7P$.

EXAMPLE II

The disodium salt of phosphorylated monoglyceride of palmitic ($C_{15}H_{31}$) and stearic ($C_{17}H_{35}$) acids was secured by the following procedure:

To 49.6 g. (0.15 mole) of the glycidyl ester of mixed palmitic and stearic acids, having an average moleculer weight of 270, was added 188 ml. of n-hexane and 12.8 g. (0.1 mole) of dehydrated polyphosphoric acid, and the mixture was stirred and refluxed for 1 hour at 69° C. After cooling to 30° C., a 1:1:1 mixture of

methanol was added with stirring until the pH was 8.2. Hexane was distilled from the mixture to remove water and methanol, and the warm solution was filtered to remove a small amount of insoluble inorganic phosphate. The resulting filtrate was added to acetone, which precipitated the product as a white solid, which was filtered ofi, washed with acetone, and dried in a vacuum to give 60.5 g. of solid for yield of 86.2%. This solid was dissolved in benzene, and the benzene was boiled off until all water was removed. After concentration and cooling, acetone was added to the solution to precipitate the product, which was filtered off and dried in a vacuum. The yield was 57.4 g. (81.7%) of white, free-flowing powder.

Infrared analysis of the product in solution in carbon disulfide developed bands (in cm.$^{-1}$) which were consistent with the structure (I), these bands being as follows:

3240 (OH)
2910 and 2850 (CH)
1750 (ester C=O)
1380 (CH)
1240 (P=O)
1160 (ester C—O)
1110 (P—O)
983 (unknown)
721 (CH)

A 1% aqueous solution of the product was clear and had a pH of 8.1. The material was soluble in benzene, hexane, carbon disulfide, chloroform, and trichloroethylene.

EXAMPLE III

The monosodium salt of phosphorlyated monolaurin ($C_{11}H_{23}$) was prepared as follows:

A mixture of 12.0 g. of glycidyl laurate (0.047 mole), 3.32 g. anhydrous polyphosphoric acid (0.039 mole) and 45 ml. hexane was heated with stirring to reflux temperature and held at reflux for 1½ hours. The insoluble polyphosphoric acid gradually dissolved giving a clear colorless solution. The solution was titrated to pH 6.8 using bromocresol purple with a 1:1:1 NaOh, methanol, water solution. The solvent was distilled off and replaced by benzene, which was then azeotroped until free of water and decanted into 300 ml. acetone. The solid which precipitated from the acetone at 4° C. was filtered off giving 7.56 g. (51.7%) of product.

The infrared spectrum was essentially the same as that described in Example II, except that the ester —C—O band at 1160 cm.$^{-1}$ was now a band, not an inflection; the unknown band at 983 cm.$^{-1}$ was weak; and a strong inflection at 1068 cm.$^{-1}$ was present. These changes correlate with the change from a di- to a monosodium salt.

EXAMPLE IV

The monosodium salt of phosphorylated monoolefin ($C_{17}H_{33}$) was prepared as follows:

A stirred mixture of 20.2 g. glycidyl oleate (0.0607 mole) and 4.1 g. anhydrous polyphosphoric acid (0.0483 mole) in 75 ml. hexane was refluxed for ½ hour. The solution gradually became clear and dark. The solution was cooled to 32° C. and titrated to pH 6.8 using bromocresol purple with sodium hydroxide-methanol-water, (1:1:1) solution. No solid precipitated. The hexane was removed by distillation and replaced by benzene, which was then azeotroped until all water was removed. A small amount of solid precipitated and was removed by filtration through Celite. The clear filtrate was concentrated by distillation and poured, after cooling, into 8 volumes of acetone, and left at room temperature. The product which separated was filtered off yielding 15.0 g. (67.9%) of nearly white powder.

The infrared spectrum was practically identical to that of Example III.

EXAMPLE V

The disodium salt of phosphorylated monoglyceride of cottonseed oil fatty acids was prepared as follows:

The glycide ester of cottonseed oil fatty acids (33.5 g., 0.1 mole), 8.53 g. of anhydrous polyphosphoric acid (0.1 mole) and 125 ml. hexane were stirred together at room temperature for 1 hour giving a clear dark solution. After refluxing for ½ hour, the solution was titrated to pH 8 or higher with sodium hydroxide-methanol-water (1:1:1) solution. The clear solution was concentrated to dryness by distillation and benzene was added and distilled off until all water was removed. The benzene solution was filtered through Celite to remove a small amount of insoluble solid and the clear filtrate was concentrated to dryness in vacuo giving 40.68 g. of a very viscous residue. The residue was dissolved in 75 ml. trichloroethylene, poured into 7 volumes of acetone and refrigerated. The solid which precipitated was filtered off giving 32.04 g. (71.0%) white powder.

The infrared curve was similar to that of Example II.

EXAMPLE VI

The disodium salt of phosphorylated glyceryl monobenzoate ($C_6H_5$) was prepared as follows:

A stirred mixture of 8.0 g. glycidyl benzoate (0.045 mole) and 3.07 g. of anhydrous polyphosphoric acid (0.036 mole) in 50 ml. of isopropyl ether was heated slowly to reflux temperature and maintained at reflux ½ hour. The sides of the flask gradually became coated with a thick viscous oil. The solvent was decanted and taken to dryness yielding 1.6 g. (0.009 mole) of unreacted glycidyl benzoate. The insoluble residue was dissolved in 50 ml. of methanol and titrated to pH 8 or higher with 1:1:1 NaOH:methanol:water solution, some white solid separating. After removal of the methanol by distillation, benzene was added, azeotroped to remove water, and the mixture was decanted into 150 ml. acetone. The solid which separated at room temperature was separated by filtration and discarded. The filtrate, when taken to dryness, yielded 8.62 g. (75.0%) of brittle, yellow solid.

The infrared spectrum (Nujol mull) had major bands at (in cm.$^{-1}$):

3330 (OH)
1720 (aromatic ester >CO)
1605
1588
1495 (aromatic double bond)
1275 (aromatic ester —C—O)
1100 (PO)
1070 and 1053 (PO and/or OH)
711 (aromatic CH)

EXAMPLE VII

The calcium salt of phosphorylated monoglyceride of palmitic ($C_{15}H_{31}$) and stearic ($C_{17}H_{35}$) acids was prepared as follows:

The product of Example II (23.1 g., 0.05 mole) and 460 ml. of water were stirred and heated to ca. 80° C., and then cooled to room temperature, giving a clear, fluid, foamy solution. With stirring, a solution of 6.7 g. (0.06 mole) of calcium chloride in 50 ml. of water was added. The solid was filtered off, washed well with water, and dried in vacuo, yielding 22.3 g. (96.6%) of white, free-flowing solid which was soluble in trichloroethylene, ether, carbon disulfide, and refined cottonseed oil. The infrared spectrum ($CS_2$ solution) was very similar to the product of Example II, except that the band at 983 cm.$^{-1}$ had shifted to 1010 cm.$^{-1}$, and a weak band at 938 cm.$^{-1}$ was present.

The ferric salt of phosphorylated monoglyceride of palmitic ($C_{15}H_{31}$) and stearic ($C_{17}H_{35}$) acids was prepared as follows:

EXAMPLE VIII

To a solution of 10 g. (0.0214 mole) of product of Example II in 500 ml. of water, prepared as above, was added slowly with shaking 9.0 g. (0.0223 mole) of $Fe(NO_3)_3 \cdot 9H_2O$ in 15 ml. water. The solid was filtered off and washed with acetone. It was mixed with benzene, and benzene was distilled off until all water was removed. After filtering from some insoluble material, the filtrate was concentrated and the product was precipitated with acetone, to give 5.65 g. (57.8%) of a yellow powder. It was soluble in trichloroethylene, but insoluble in ether or refined cottonseed oil. The infrared curve (Nujol mull) was basically similar to that of Example II, except that the bands at 983 cm.$^{-1}$ and at 1240 cm.$^{-1}$ were lacking.

The invention has been described in detail with particular reference to preferred embodiments thereof, but it will be understood that variations and modifications can be effected within the spirit and scope of the invention as described hereinabove and as defined in the appended claims.

We claim:

1. A method for preparing a compound having the structure (I) $RCO-O-CH_2CHOHCH_2-O-PO(OR')(OR'')$ wherein R represents an aliphatic hydrocarbyl fatty acid radical having 10 to 20 carbon atoms or an aromatic radical, and R' and R'' represent hydrogen, said method comprising reacting a glycidyl ester of an aliphatic hydrocarbyl fatty acid having 10 to 20 carbon atoms or benzoic acid having the structure (II) $RCO-O-CH_2CHCH_2\diagdown O \diagup$ with anhydrous phosphoric acid in an organic solvent for the glycidyl ester and the product compound which is a nonsolvent for said phosphoric acid.

2. A method in accordance with claim 1, also comprising reacting said Compound I with a univalent metal hydroxide to form a Compound III wherein at least one of the hydrogens represented by R' and R'' is replaced by univalent metal.

3. A method in accordance with claim 2, also comprising reacting an aqueous solution of said Compound III, wherein both of said hydrogens have been replaced by univalent metal, with a water soluble salt of a polyvalent metal to form a Compound IV wherein both univalent metal atoms have been replaced by a single polyvalent metal atom.

4. A method in accordance with claim 1 wherein said organic solvent is an aliphatic hydrocarbon.

5. A method in accordance with claim 1 wherein said phosphoric acid is present in an amount of not more than one mole per mole of glycidyl ester, and the temperature does not exceed 100° C.

6. A method in accordance with claim 1 wherein R is $C_6H_5$.

7. A method in accordance with claim 1 wherein R is a fatty acid radical having from 10 to 20 carbon atoms.

8. A method in accordance with claim 1 wherein said ester and said acid are reacted in an organic solvent for the glycidyl ester and the product compound which is a nonsolvent for said phosphoric acid, said solvent being selected from the group consisting of petroleum ether, ligroin, hexane, dioxane, chloroform, trichloroethylene, benzene, xylene and isopropyl ether.

9. A method in accordance with claim 1 wherein said anhydrous phosphoric acid is selected from the group consisting of dehydrated orthophosphoric acid, pyrophosphoric acid and polyphosphoric acid, and has a $P_2O_5$ equivalent of at least 72%.

10. A method in accordance with claim 9 wherein R represents at least one fatty acid radical of an acid selected from the group consisting of lauric, palmitic, stearic and oleic.

References Cited

UNITED STATES PATENTS 3,112,335  11/1963  Ronay et al. _____ 260—978

ALEX MAZEL, *Primary Examiner.*

J. A. NARCAVAGE, *Assistant Examiner.*

U.S. Cl. X.R.

99—163; 260—978

UNITED STATES PATENT OFFICE
CERTIFICATE OF CORRECTION

Patent No. 3,423,440                                                    January 21, 1969

John D. Cawley et al.

It is certified that error appears in the above identified patent and that said Letters Patent are hereby corrected as shown below:

Column 1, line 52, "POCl," should read -- $POCl_3$ --. Column 3, line 3, "crystalliaztion" should read -- crystallization --. Column 3, between lines 5 and 6 insert -- ture, the efficiency of stirring, and other well-known fac- --; line 56, "0.1 mole" should read -- 0.15 mole --. Column 4, line 40, "monoolefin" should read -- monoolein --. Column 5, line 58, cancel "EXAMPLE VIII" and insert the same between lines 54 and 55, same column 5.

Signed and sealed this 17th day of March 1970.

(SEAL)
Attest:

Edward M. Fletcher, Jr.                                    WILLIAM E. SCHUYLER, JR.
Attesting Officer                                                     Commissioner of Patents